United States Patent [19]

Brown et al.

[11] 4,008,261

[45] Feb. 15, 1977

[54] METHOD OF PREPARING PHOSPHONIUM SILOXANES AND PRODUCTS THEREOF

[75] Inventors: Eric D. Brown; Roger G. Chaffee, both of Midland, Mich.

[73] Assignee: Dow Corning Corporation, Midland, Mich.

[22] Filed: Jan. 2, 1975

[21] Appl. No.: 537,877

[52] U.S. Cl. .................. 260/448.2 E; 260/448.2 R
[51] Int. Cl.$^2$ ............................................ C07F 7/18
[58] Field of Search ............. 260/448.2 R, 448.2 E

[56] References Cited

UNITED STATES PATENTS

| | | | |
|---|---|---|---|
| 2,683,674 | 7/1954 | Hatcher et al. | 260/448.2 R UX |
| 2,739,952 | 3/1956 | Linville | 260/448.2 R UX |
| 2,789,109 | 4/1957 | Grubb, Jr. | 260/448.2 R X |
| 2,830,967 | 4/1958 | Nitzsche et al. | 260/448.2 R X |
| 2,908,699 | 10/1959 | Jex et al. | 260/448.2 E UX |
| 2,934,550 | 4/1960 | Jack | 260/448.2 E |
| 3,057,821 | 10/1962 | Boot | 260/448.2 R UX |
| 3,271,359 | 9/1966 | Bluestein | 260/448.2 E |

FOREIGN PATENTS OR APPLICATIONS

| | | | |
|---|---|---|---|
| 303,332 | 5/1971 | U.S.S.R. | 260/448.2 E |

*Primary Examiner*—Allen B. Curtis
*Attorney, Agent, or Firm*—George A. Grindahl

[57] ABSTRACT

Phosphorus-containing catalysts that are suitable for polymerizing polyorganosiloxanes are prepared from tetraorgano phosphonium halides, a basic compound, such as sodium hydroxide, and an organosilicon compound. The catalyst must be prepared at a temperature of at least 30° C. The catalysts are moisture sensitive but possess improved shelf-life stability. They are used to polymerize polyorganosiloxanes and can subsequently be inactivated by heating to a temperature above approximately 130° C. for a suitable length of time.

16 Claims, No Drawings

METHOD OF PREPARING PHOSPHONIUM SILOXANES AND PRODUCTS THEREOF

BACKGROUND OF THE INVENTION

1. Field of the Invention

The present invention relates to a new method for preparing phosphorus-containing catalysts, to the polymerization catalysts that are made by this new method, and to the use of said catalysts for the polymerization of polyorganosiloxanes.

2. Description of the Prior Art

The desirability of polymerizing polyorganosiloxanes of low molecular weight to higher molecular weight fluids, gums and resins is well known in the art. The use of conventional catalysts, such as sulfuric acid and potassium hydroxide to facilitate the condensation reactions and the equilibration process that occurs during the polymerization of polyorganosiloxanes is also well known in the art and therefore needs no further elaboration.

When a known conventional catalyst is allowed to remain in the polymerized polyorganosiloxane, the high molecular weight polymer tends to undergo catalytic depolymerization in the presence of moisture or heat or both. Several methods for avoiding such catalytic depolymerization are known in the art and are directed to treatment of the catalyst.

One example of catalyst treatment using phosphonium compounds is the method described by U.S. Pat. No. 3,103,502 wherein an organopolysiloxane which has been polymerized with an alkali metal hydroxide catalyst such as potassium hydroxide is mixed with a quaternary phosphonium compound such as tetraethyl phosphonium iodide. A polyorganosiloxane gum, stable to heat can be obtained by such method. Such a method is better suited for fluid polymers than for the more viscous gum polymers and resin polymer, because intimate mixing of the polymer and the phosphonium compound is required and ease of mixing is facilitated by low viscosity.

An alternate method for avoiding catalytic depolymerization of organopolysiloxanes is taught by U.S. Pat. No. 2,883,366 wherein a basic quaternary phosphonium compound such as tetra-n-butyl phosphonium hydroxide and tetra-n-butyl phosphonium butoxide is used as the polymerization catalyst instead of an alkali metal hydroxide. When desired, the catalyst can be destroyed with heat without appreciably affecting the molecular weight of the polyorganosiloxane. However, quaternary phosphonium hydroxides and alkoxides are much more expensive than potassium hydroxide. In addition, said phosphonium hydroxides and alkoxides are much less stable than alkali metal hydroxides. A less expensive, more stable quaternary phosphonium catalyst has been sought for polymerizing siloxanes.

SUMMARY OF THE INVENTION

It is an object of this invention to provide a new method for preparing phosphorus-containing catalysts that are suitable for polymerizing polyorganosiloxane. Another object of this invention is to provide quaternary phosphonium catalysts that are less expensive and that display better shelf-life than current, state-of-the-art phosphonium catalysts. It is a further object of this invention to provide a method of polymerizing polyorganosiloxanes of diverse natures and using the catalysts of this invention. Other objects will become obvious from the following description of the invention.

This invention relates to a method for preparing phosphorus-containing polymerization catalysts by mixing an organosilicon compound, a quaternary phosphonium compound, a basic compound and at least sufficient water to dissolve the basic compound and subsequently removing water from the resulting mixture at a temperature in the range from at least 30° to 100° C. to yield an anhydrous catalyst which also contains an insoluble, non-catalytic, by-produced salt. This method also encompasses removing said salt from the anhydrous catalyst to yield a homogeneous, anhydrous catalyst.

DESCRIPTION OF THE INVENTION

There is provided by the present invention a method for preparing a catalyst suitable for polymerizing polyorganosiloxanes comprising (a) mixing (1) a benzene-soluble organosilicon compound of the average unit formula

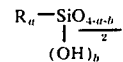

where R is a radical of 1 to 8 carbon atoms selected from the group consisting of monovalent hydrocarbon radicals, monovalent fluorinated aliphatic radicals and monovalent halogenated aryl radicals, $a$ has an average value of from 1 to 3 and $b$ has an average value of from 0 to 1, (2) a quaternary phosphonium compound of the formula

where each $R'$ is a monovalent hydrocarbon radical of 1 to 18 carbon atoms free of aliphatic unsaturation and X is chlorine, bromine or iodine, (3) a basic compound of the formula, MOH, where M is an alkali metal and (4) water in at least a sufficient quantity to dissolve the basic compound (3), wherein the quaternary phosphonium compound is present in an amount equal to from 0.03 moles to 1.5 moles for each 1000 grams of the organosilicon compound and the basic compound is present in an amount equal to from 90% to 110% by moles, based on the number of moles of the quaternary phosphonium compound, (b) removing substantially all of the water from the mixture of (a) at a temperature of from at least 30° to 110° C., and (c) recovering the remainder of the mixture as an anhydrous catalyst, containing an insoluble, non-catalytic, by-produced salt, MX, where M and X are as defined above. There is also provided by this invention a method for preparing a homogenous anhydrous catalyst suitable for polymerizing polyorganosiloxanes wherein the anhydrous catalyst of (c) is freed of the by-produced salt, MX, and the remainder is recovered as said homogenous anhydrous catalyst.

The organosilicon compounds that are suitable for preparing the catalysts of this invention are represented by the average unit formula

and are soluble in benzene.

R can be any monovalent hydrocarbon radical of 1 to 18 carbon atoms such as alkyl radicals such as methyl, ethyl, isopropyl, hexyl, or octadecyl; alkenyl radicals such as vinyl, allyl, hexenyl; alkynyl radicals such as propargyl; cycloaliphatic radicals such as cyclopentyl, cyclohexyl or cyclohexenyl; aromatic hydrocarbon radicals such as phenyl, tolyl, xenyl, or naphthyl; aralkyl hydrocarbon radicals such as benzyl, beta-phenylethyl, beta-phenylpropyl or gamma-tolylpropyl; any monovalent fluorinated aliphatic group of the formula $R''CH_2CH_2$—where $R''$ can be any fluoroalkyl group such as fluoromethyl, trifluoroethyl or tetrafluorocyclobutyl or any perfluoroalkyl group such as perfluoromethyl, perfluoroethyl, perfluoroisobutyl, perfluoroheptyl, perfluorooctyl, perfluorovinyl or perfluorocyclopentyl; any monovalent halogenated aromatic group such as dichlorophenyl, tetrabromoxenyl, tetrachlorophenyl, alpha,alpha,alpha-trifluorotolyl, iodonaphthyl, or perfluorophenyl, or any halogenated aralkyl group such as chlorobenzyl, beta-(chlorophenyl)ethyl, beta-(iodophenyl)ethyl, beta-(bromophenyl)propyl, or beta-(perfluorophenyl) ethyl, $a$ has an average value of from 1 to 3 and $b$ has an average value of from 0 to 1.

While the R groups of organosilicon compound of formula (I) can all be identical, it is to be understood that mixtures of any number of the aforementioned R groups can also be present. For example, an organosilicon compound of formula (I), regardless of the value of $a$ or $b$ within stated limits, may contain R radicals that are only methyl or a mixture of methyl and phenyl radicals or a mixture of methyl and 3,3,3-trifluoropropyl radicals, or a mixture of vinyl, phenyl and methyl, etc. The organosilicon compound, expressable by formula (I), can be a pure species or a mixture of compounds, the individual members of which contain varying values of $a$ and $b$ within the stated limits.

Thus, compounds of the formula (I) include hydroxyl-free, benzene-soluble organosilicon compounds such as simple hexaorganosiloxanes of the formula

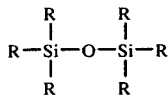

triorganosilyl-endblocked linear siloxanes of the formula

where $m$ has a value of from 1 to 30 and more, cyclic siloxanes of the formula

where $n$ has a value greater than 2, e.g. 3 to 20 and more and organosilicon compounds in which there is, on the average, less than two R groups per silicon atom. Mixtures of said hydroxyl-free organosilicon compound are also operable in the practice of this invention. Compounds of the formula (I) also include benzene-soluble organosilicon compounds that contain silicon-bonded hydroxyl radicals. It is within the scope of this invention to use triorganosilanols such as trimethylsilanol; polyorganosiloxanols, such as compounds of the formula

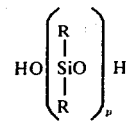

where $p$ has a value of from 2 to 100 and more; and hydroxyl-containing organosilicon compounds that have, on the average, more than two silicon-bonded hydroxyl radicals per molecule. It is to be understood that formula (I) embraces mixtures comprising hydroxyl-free polyorganosiloxanes and hydroxyl-containing organosilicon compounds.

A particularly useful embodiment of this invention is the use of organosilicon compounds of formula (I) where $a$ is limited to average values of from 1.9 to 2.5. Compounds that are included in said useful embodiment include decaorganotetrasiloxanes, tetraorganodihydroxydisiloxanes, triorganosilyl-endblocked polydiorganosiloxanes of the formula

where $q$ has a value of from 2 to 30 and more. Obviously, many other possible compounds and mixtures of compounds exist and are suitable for this invention. A preferred embodiment of the present invention, within said useful embodiment, is the use of organosilicon compounds of formula (I) where $a$ has an average value of from 1.98 to 2.02 and $b$ has an average value of from 0 to 0.7. Thus, one example of a preferred organosilicon composition for the purposes of this invention is a mixture of cyclic diorganosiloxanes and hydroxyl-endblocked linear diorganopolysiloxanes such as might be obtained from the hydrolysis of a diorganodichlorosilane. Another example of the preferred embodiment of this invention is the use of a mixture of a major amount of diorganocyclopolysiloxanes and a minor amount of a low viscosity triorganosilyl-endblocked polyorganosiloxane with an average of 10 to 50 silicon atoms per molecule. Such a mixture serves to produce a catalyst that possesses a preferred viscosity. Said mixture also provides a source of triorganosilyl endblocking groups when the catalyst is used to polymerize polyorganosiloxanes to higher molecular weight fluids. A third example of the preferred embodiment of this invention is the use of octamethylcyclotetrasiloxane as the organosilicon compound of formula (I).

The organosilicon compounds of formula (I) are well known in the art and many are commercially available. They are most conveniently prepared by hydrolysis of one or more appropriately substituted chlorosilanes. For example, hydrolysis of dimethyldichlorosilane will produce a mixture of dimethylcyclopolysiloxanes and hydroxyl-endblocked polydimethylsiloxane. Hydrolysis of trimethylchlorosilane will yield hexamethyldisiloxane. Hydroxyl-containing organosilicon compounds can also be prepared by the buffered hydrolysis of the corresponding chlorosilane or by the catalyzed hydrolysis of the corresponding hydrogen containing silane. Trimethylsilyl-endblocked polydimethylsiloxanes are commercially available as fluids with several viscosities.

The quaternary phosphonium compounds that are useful in this invention have the formula $$R_4'PX \qquad (II)$$

where R' can be any monovalent hydrocarbon radical free of aliphatic unsaturation containing 1–8 carbon atoms such as alkyl radicals such as methyl, ethyl, isopropyl, butyl, and octadecyl, cycloaliphatic hydrocarbon radicals such as cyclopentyl, cyclohexyl or methylcyclohexyl; aryl hydrocarbon radicals such as phenyl, xenyl, tolyl, napththyl or anthracyl and aralkyl hydrocarbon radicals such as benzyl, 2-phenylethyl, 2-phenylpropyl, and mixtures of said radicals, and X is chlorine, bromine or iodine. Most quaternary phosphonium compounds of formula (II) are water soluble, crystalline solids; some are hygroscopic as well.

Compounds of the formula (II) most conveniently contain four identical R' radicals or three identical R' radicals and one differing R' radical. It is to be understood, however, that quaternary phosphonium compounds with the formula (II) having any combination of R' radicals are suitable in the practice of this invention. Examples of suitable quaternary phosphonium compounds are tetrabutyl phosphonium chloride, butyltricyclohexyl phosphonium chloride, diethyldiphenyl phosphonium iodide, dipropylmethylphenyl phosphonium iodide, tetraethyl phosphonium bromide, benzyltriethyl phosphonium chloride and phenyltrimethyl phosphonium iodide. Because of its commercial availability, and relatively low cost, tetra-n-butyl phosphonium chloride is preferred in the practice of this invention. Another reason for preferring tetra-n-butyl phosphonium chloride is that a catalyst prepared from this material will not produce a foul smelling by-product during thermal decomposion as is the case with tetramethyl phosphonium-based catalysts, for example. Information regarding the preparation, properties and reactions of quaternary phosphonium compounds is available in "Organophosphorus Compounds, " by G. M. Koslapoff, John Wiley and Sons, Inc., New York, 1950, Chapter 5, which is hereby incorporated by reference.

The basic compounds that are useful in this invention have the formula $$MOH \qquad (III)$$

where M is an alkali metal such as lithium, sodium, potassium, rubidium and cesium. Once could use other compounds which would be transformed, through the action of water, into basic compounds of the formula (III). Such a technique is within the scope of the method of this invention. For example, sodium methoxide, when dissolved in water, is converted to sodium hydroxide and methanol. Similarly, butyl lithium is converted by water to lithium hydroxide and butane. The useful basic compounds are all well known in the chemical art and are commercially available. A highly preferred alkali metal hydroxide is NaOH.

According to the method of the present invention the organosilicon compound is mixed with the quaternary phosphonium compound, the basic compound, and sufficient water to dissolve the basic compound. The exact amount of water that is regarded as sufficient will depend upon the amount of basic compound and the identity of the basic compound that is used. For example, sodium hydroxide is more soluble in water than lithium hydroxide and thus will require less water than an equal weight of lithium hydroxide.

The amount of quaternary phosphonium compound that is mixed with the organosilicon compound can vary widely. An effective catalyst can be prepared with as little as 0.03 moles or as much as 1.5 moles of quaternary phosphonium compound for each 1000 grams of organosilicon compound. Concentrations of quaternary phosphonium compound that are much less than 0.03 moles/1000g. of organosilicon compound yield catalysts that have an undesirably large neutral equivalent. The neutral equivalent of a catalyst of this invention is the weight of catalyst that is required to neutralize 1 mole of a monobasic acid such as HC1. The larger the neutral equivalent of a catalyst, the greater will be the weight of catalyst needed to achieve a given catalyst concentration. Concentrations of quaternary phosphonium compound greater than about 1.5 moles/1000 grams of organosilicon compound, entail the handling of fluids containing large amounts of the by-produced salt, MX, and also result in catalysts that are very alkaline. A preferred concentration of quaternary phosphonium halide in organosilicon compound is approximately 0.1 to 0.8 moles for each 1000 grams of organosilicon compound.

The amount of basic compound that is mixed with the organosilicon compound is determined by the amount of quaternary phosphonium compound that is used. We have found that an amount of basic compound that is approximately equal on a mole basis, to the amount of quaternary phosphonium compound is desirable. Use of a quantity of basic compound that is much greater than an equal amount, on a mole basis, to the amount of quaternary phosphonium compound can result in a catalyst that cannot be destroyed by heat and will often act as a catalyst for depolymerization of the polymerized polyorganosiloxane. A quantity of basic compound that is much less than the amount that is equal on a mole basis, to the amount of quaternary phosphonium compound would produce a catalyst of this invention but would be wasteful of the relatively expensive quaternary phosphonium compound. For the purposes of this invention it is preferred to employ 0.9 to 1.10 moles of basic compound per mole of quaternary phosphonium compound employed.

It is a preferred embodiment of the present invention to dissolve the basic compound in water and the quaternary phosphonium compound in water and then mix the resulting solutions, in any order, with the organosilicon compound. This is done for processing convenience, for accurate metering of ingredients in process equipment and to control exothermic reactions that often occur when alkali metal hydroxides are dissolved in small quantities of water. It should be understood that while only a sufficient quantity of water to dissolve the basic compound is required, additional water may be used, if desired.

The ingredients may be mixed at any combination of pressure and temperature that will not cause appreciable decomposition of reagents or products or cause premature loss of reagents by any means, such as evaporation. For most purposes the ingredients can be best mixed at room temperature, or slightly higher, and at atmospheric pressure.

Mixing can be accomplished by any of several means that will insure a substantially homogeneous distribution of reagents quarternary phosphonium compound, basic compound and water in the organosilicon compound. Thus, stirring, kneading, tumbling, flowing, and shearing and the like, either in a continuous process or a batch process may be used to achieve the necessary mixing. Solvents may be used to facilitate this mixing process. Furthermore, solvents that form azeotropes with water have the added utility of offering one means to remove water from the reaction mixture. For example, benzene, in which the organosilicon compound is soluble, can be used. Other useful solvents include toluene, xylene, cyclohexane and heptane.

Once the basic compound has been dissolved, and some mixing of the members has been accomplished, removal of water from the mixture can be initiated. Substantially complete removal of water from the reaction mixture can be accomplished by any of several means. Thus, it is within the scope of this invention to remove water by evaporation, especially at reduced pressure, or by entrainment in a stream of gas such as a nitrogen purge, or by azeotropic distillation with a suitable solvent such as benzene, or by adsorption with a drying agent or by a combination of these or similar means. One point is critical. Whatever the means of water removal, it must be accomplished at a temperature of at least 30° C. Effective catalysts cannot be made by this process at dehydrating temperatures below 30° C. It is not known why a temperature of at least 30° C. must be used. While we do not wish this invention to be limited by theory, we believe that substantially complete removal of water from the reaction mixture is not accomplished at temperatures below 30° C. It is further suggested that the catalyst so prepared may derive its excellent shelflife stability, by some as-yet-unknown mechanism, through the unique process of this invention.

Although a temperature of at least 30° C. is required for the removal of water, very high temperatures are to be avoided. The catalyst of this invention undergoes decomposition at a rate which is directly proportional to temperature. At temperature approaching 130° C. this decomposition is exceedingly rapid. As a matter of practical concern a temperature of 100° C. should not be exceeded during the preparation of the catalyst. We have found that a temperature of approximately 45° C. is preferred for removal of substantially all of the water from the mixture without causing undue decomposition of the catalyst being prepared.

We believe the best way to practice this invention is to dissolve tetra-n-butyl phosphonium chloride and sodium hydroxide in as little water as possible and to mix the resulting solutions with a mixture of 85 parts of octamethylcyclotetrasiloxane and 15 parts of a low viscosity trimethylsilyl-endblocked polydimethylsiloxane fluid having an average of 25 silicon atoms per molecule, at approximately 45° C. and to remove water at less-than-atmospheric pressure, maintaining the temperature at 45° C. The remaining anhydrous material is a catalyst for the polymerization of polyorganosiloxanes. Frequently some of the organosilicon compound is removed by this dehydrating process, along with substantially all of the water. The removed organosilicon compound can be collected, dried and used to prepare more catalyst.

Once the water has been removed from the mixture, the resulting anhydrous catalyst contains an insoluble, by-produced, non-catalytic salt, MX. In the best method of this invention, the insoluble salt is NaCl. This salt is an innocuous ingredient in the catalyst and can, in most cases, be left in the anhydrous catalyst with no ill effects on the catalyst activity or the polyorganosiloxanes that are polymerized with the catalyst. However, its presence in the catalyst may be detrimental to the measuring or handling of the catalyst in a commercial process. Its presence in polymerized polyorganosiloxanes may also be undesirable. Thus, a more desirable form of the catalyst is obtained by removing the insoluble salt, e.g. NaCl, from the anhydrous catalyst to yield a homogeneous anhydrous catalyst. This removal of salt can be accomplished by the usual techniques such as filtration, centrifugation, settling and decantation or the like or a combination of said techniques.

Precautions should be taken to keep the catalyst away from moisture, since it is hydroscopic. While the catalyst of this invention is deactivated in the presence of water, it is not destroyed by water. If the catalyst should become wet, and hence deactivated, it can be reactivated by removing the water from the catalyst at a temperature of at least 30° C. using any of the aforementioned dehydrating techniques.

The anhydrous catalyst prepared by the method of this invention is more stable to long-term storage than are the current phosphonium compound catalysts. Tetra-n-butyl phosphonium hydroxide, dissolved in siloxane solution, is reported to lose 10 percent of its activity in 1 month at room temperature as shown by A. R. Gilbert and S. W. Kantor, J. Poly. Sci., XL, p. 41 (1959). Catalysts prepared by this invention display 100% of the original activity after 6 months of storage at room temperature.

The catalysts of the present invention are useful for the polymerization of benzene-soluble polyorganosiloxanes of the average unit formula

  (IV)

wherein R is as defined above, c has an averate value of from 0 to 1.0 and d has an average value of from 1.0 to less than 3.0.

It is to be understood that in the polyorganosiloxanes that can be polymerized using the catalysts of this invention, R is as defined above. The polyorganosiloxane can be a pure species, a mixture of several pure species or a poly component mixture of compounds of varying molecular weight and structure as long as the polyorganosiloxane on the average, can be represented by formula (IV) and is soluble in benzene. For example, the polyorganosiloxane can be octamethylcyclotetrasiloxane, or any cyclic siloxane or mixture of cyclic siloxanes of the formula

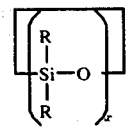

where x has a value of greater than two, e.g. from 3 to 20 and more. In addition, the polyorganosiloxane can be a mixture of said cyclic siloxanes with a triorganosilyl-endblocked polydiorganosiloxanes of the average formula

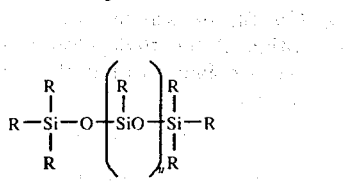

where R is as defined above and $y$ has a value of from 0 to 100 and more.

The polyorganosiloxane can also be a mixture of said cyclic siloxanes and hydroxyl-endblocked polyorganosiloxanes of the average formula

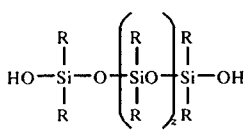

where R is as defined above and $z$ has a value of from 0 to 100 and more. A mixture of said cyclic siloxanes, said triorganosilyl-endblocked polyorganosiloxanes and said hydroxyl-endblocked polyorganosiloxanes is also within the scope of this invention if it is expressable by formula (IV). Furthermore, polyorganosiloxanes with less than two R radicals per silicon atom are within the scope of this invention if they are soluble in benzene.

The method of increasing the molecular weight of a polyorganosiloxane of formula (IV) is accomplished by mixing a catalytic amount of the phosphorous-containing catalyst with a relatively low molecular weight polyorganosiloxane and heating the resulting mixture at a temperature of from at least 30° C. to less than 130° C., removing substantially all of the water that is present until the desired increase in molecular weight is effected. The amount of water that will be removed will be the total of the free water in the mixture and the water that results from the condensation of silicon-bonded hydroxyl radicals to form silicon-oxygen-silicon linkages and water. Thus, polyorganosiloxanes of formula (IV), where $c$ is not zero, will liberate water which must be removed during the process of increasing molecular weight. Mixtures of dry polyorganosiloxanes where $c = 0$, with a catalyst which is dry, i.e. which contain no free water will experience an increase in molecular weight without a loss of water. Such a process is well known in the art as a siloxane equilibration process. It is essential that such a mixture be kept dry during said equilibration process. The mixing of the polyorganosiloxane and the catalyst may be accomplished by any of the methods described above for the preparation of the catalyst. Removal of water from the mixture of polyorganosiloxane and the catalyst may be accomplished by any of the methods described above for the preparation of the catalyst. When the desired increase in molecular weight has been accomplished, the mixture can be exposed to moisture which will deactivate the catalyst and stop the process of increasing the molecular weight.

The catalyst can be destroyed by heating the mixture to a temperature above 130° C. for a brief period of time. Higher temperature will require shorter periods of time. Temperatures that are excessively high, however, should not be used in order to avoid thermal degradation of the high molecular weight polyorganosiloxane. We prefer to heat the polymerized polyorganosiloxane at 150° C. for about 1 hour to destroy the catalyst. If said destruction of the catalyst is conducted in the presence of moisture, little or no change in the molecular weight of the polymerized polyorganosiloxane will occur during the destruction process, since the catalyst is deactivated by moisture.

The amount of catalyst that is used in the method of polymerizing polyorganosiloxanes is not narrowly critical. The ratio of the number of moles of polyorganosiloxanes to the number of equivalents of catalyst can vary from 100 to 1,000,000. A common ratio used in the art is 10,000. The number of moles of polyorganosiloxane can be determined by dividing the weight of polyorganosiloxane that is used by the average unit formula weight of IV. For example, 100 grams of octamethylcyclotetrasiloxane with an average unit formula, $(CH_3)_2SiO$, and an average formula weight of 74.16, would contain about 1.34 moles of polyorganosiloxane. The number of equivalents of catalyst can be determined by dividing the catalyst weight by its neutral equivalent. The neutral equivalent of the catalyst can be determined by titrating a known weight of sample with 0.1N HCl to a bromocresol purple endpoint and using the following formula.

$$\text{Neutral equivalent} = \frac{\text{Sample weight (grams)} \times 1000}{\text{milliliters of HCl} \times 0.1}$$

The temperature at which the polyorganosiloxanes are polymerized can vary between 30° and 130° C. Since the rate of polymerization depends upon temperature, we prefer to conduct the polymerization process at a temperature from 80° to 120° C. Temperatures exceeding 130° C. result in rapid decomposition of the catalyst, and are not practical. Temperatures from 30° to 80° C. can be used, with an attendant slower rate of polymerization.

The following examples are included to illustrate the method of this invention and are not to be taken as limiting the invention which is delineated by the appended claims. All viscosities were measured at 25° C.

The first seven examples illustrate the method of this invention for preparing a catalyst.

EXAMPLE 1

Dimethylsiloxane cyclics, 3160 g, and 546 g. of trimethylsilyl-endblocked polydimethylsiloxane having a viscosity of 20 cs. were added to a reactor equipped with a stirrer and provision for vacuum. Tetra-n-butylphosphonium chloride, 696 g. (2.363 mols.) was dissolved in 200 ml. of water, and added to the reactor. Sodium hydroxide 92.77 g. (2.319 mols) was dissolved in 160 ml. of water and slowly added to the reactor over a period of about two minutes while the contents of the reactor was stirred. Aspirator vacuum (about 75 mm. of mercury pressure) was drawn and the mixture, with continued stirring, was gradually and gently heated. At about 31° C. there was the onset of reaction and a substantial amount of vapor began coming out of the reaction mixture. The vapors were conducted away from the reaction vessel and condensed in a flask submerged in a water-ice bath. The heat was maintained at 40° C. along with stirring and vacuum for a total of 16 hours. The reaction mixture was cooled and the vacuum released. The mixture was vacuum-filtered through a thin bed of a diatomaceous earth supported on a medium-porosity sintered glass plate. This filtrate was sparkling clear but highly yellow in color, and had a neutral equivalent of 1800 and a sodium content of 0.14%. The condensed vapors were found to consist of 150 ml. of water and 120 ml. of dimethylcyclopolysiloxane. The balance of the water escaped the ice-cooled trap and was lost to the water aspirator system.

EXAMPLE 2

Dimethylsiloxane cyclics 3160 g., and 546 g. of 20 centistokes trimethylsilyl-endblocked polydimethylsiloxane were placed in a flask. Tetra-n-butyl phosphonium chloride, 173.9 g. (0.590 mole), diluted to 320 ml. with water and sodium hydroxide, 23.19 g. (0.580 mole), diluted to 40 ml. with water were added to the flask. Aspirator vacuum was applied, and the mixture, while being stirred, was gently heated to a maximum of 45° C. until the mixture no longer bubbled. There was recovered 180 ml. of dimethylsiloxane cyclics and 150 ml. of water in the trapping system. The balance of the water was lost to the water aspirator system. The mixture was cooled to room temperature and the vacuum released. Filtration was done as in Example 1. The viscosity of this catalyst was considerably below 200 centipoise at 25° C. The neutral equivalent was about 6200.

EXAMPLE 3

Dimethylsiloxane cyclics, 3692 g., was placed in a flask. To this was added 173.9 g. (0.590 mole) of tetra-n-butyl phosphonium chloride, diluted to 320 ml. with water and sodium hydroxide, 23.19 g. (0.580 mole), diluted to 80 ml. with water. Aspirator vacuum was applied and the mixture was stirred and heated slowly to a maximum of 40° C. When the mixture no longer bubbled it was cooled to room temperature and the vacuum released. The precipitated sodium chloride was removed by filtration through a porous glass plate as described in Example 1. The filtrate became cloudy during the latter stages of filtration (presence of moisture suspected), so the filtrate was warmed gently, while a vacuum and stirring were applied, until it again cleared. The neutral equivalent was 6200. This catalyst was effective for polymerizing a polyorganosiloxane to a higher molecular weight fluid.

EXAMPLE 4

Dimethylcyclopolysiloxane, 439 g., and pentane, 450 ml. were placed in a flask. Sodium hydroxide pellets, 5.8 g. (0.145 mole) dissolved in about 10 ml. of water and tetra-n-butyl phosphonium chloride (0.145 mole), 42.7 g. dissolved in 75 ml. of water were mixed together and the resulting solution was added to the flask. The mixture was heated to reflux for 12.5 hours during which time 83 ml. of water was isolated via the azeotropic water trap. Upon filtration a solid was removed. Analysis of the catalyst solution revealed that it had a neutral equivalent of 7143 and contained 6.4–6.7 ppm.

sodium. The filtrate was an effective catalyst for the polymerization of dimethylcyclopolysiloxane to a gum polymer. After polymerization, the catalyst was deactivated with heat.

EXAMPLE 5

This is a repeat of Example 4 except that the sodium hydroxide was dissolved in 21 ml. of water and added to the dimethylcyclopolysiloxane and then the tetra-n-butyl phosphonium chloride was added as a solid. Ten hours were required to remove slightly more than 21 ml. of water by the azeotropic reflux. Again the reaction was filtered to remove the solid that formed. This catalyst solution had a neutral equivalent of 6250 and contained 89 ppm. of sodium. The catalyst was effective for polymerizing a polyorganosiloxane to a higher molecular weight.

EXAMPLE 6

The method of Example 4 was used to prepare the catalyst in cyclohexane. The water that was used to solubilize the sodium hydroxide and tetra-n-butyl phosphonium chloride was removed using a partial vacuum azeotrope. This vacuum procedure is needed to lower the boiling temperature of the cyclohexane to prevent decomposition of the catalyst. Again, the catalyst was filtered to remove the solid that formed. This catalyst was used to polymerize dimethylsiloxane cyclics to a higher molecular weight fluid. The catalyst was subsequently deactivated with heating at 150° C.

EXAMPLE 7

When 5,000 g. of

is melted and mixed with an aqueous solution of 173.9 g. (0.590 mole) of tetra-n-butyl phosphonium chloride and an aqueous solution of 23.2 g. (0.580 mole) or sodium hydroxide and the thoroughly stirred mixture is devolatilized at a maximum temperature of 45° C. with the aid of a vacuum so as to remove substantially all of the water from the mixture, an anhydrous catalyst is obtained. When the cooled anhydrous catalyst if filtered to remove the by-produced salt, NaCl, a homogeneous anhydrous catalyst with a neutral equivalent of approximately 2,000 is obtained as a filtrate.

EXAMPLE 8

This example demonstrates the excellent shelf-life stability of the catalyst prepared by the method of this invention. Two catalysts were prepared by the method of Example 2. Table I lists the materials used and the properties of the resulting catalysts. Any decrease in catalytic activity is indicated by an increase in neutral equivalent. The indicated amount of sodium hydroxide was diluted to 40 ml. with water and the tetra-n-butyl phosphonium chloride was diluted to 320 ml. with water before beng added to the dimethylsiloxane cyclics.

TABLE I

| Reactants and Properties | Catalyst A | Catalyst B |
|---|---|---|
| Dimethylsiloxane Cyclics | 405 ml. | 335 ml. |
| Trimethylsilyl endblocked polydimethylsiloxane (20 centistokes at 25°C.) | 70 ml. | 140 ml. |
| NaOH | 23.19 g. | 23.19 g. |
| Bu$_4$PCl | 173.9 g. | 173.9 g. |
| Viscosity of filtered catalyst | 403 cs. | 428 cs. |
| Neutral Equivalent of filtered catalyst | | |

TABLE I-continued

| Reactants and Properties | Catalyst A | Catalyst B |
|---|---|---|
| Initial | 1148 ± 30 | 1040 ± 50 |
| Two months | 1146 ± 25 | 1180 ± 25 |
| Four months | 1153 ± 15 | 1110 ± 15 |
| Six months | 1067 | 1032 |

The next five examples illustrate the use of the catalyst to polymerize polyorganosiloxanes.

EXAMPLE 9

One half gram of the catalyst prepared in Example 4 was added to about 59.5 g. (0.80 mole) of dimethylcyclopolysiloxane with a viscosity of 3.0 centistokes which had been predried under a nitrogen gas sweep at 110° C. Moles of polyorganosiloxane/equivalents of catalyst = 11,400. Polymerization was rapid, indicative of a dry catalyst. After 5 minutes the stirrer was stopped and after 1 hour the resulting viscous polymer was heated to 150° C. for 1 hour to rapidly decompose the catalyst. The polymer had a 13.7% weight loss after 3 hrs. at 250° C. indicating loss of the normal equilibrium cyclics and inactivation of the catalyst.

EXAMPLE 10

A polymer, prepared by the method of Example 9 using the catalyst prepared in Example 5, had a weight loss of 13.88% after 3 hrs. at 250° C. indicating loss of equilibrium cyclics and inactivation of the catalyst.

EXAMPLE 11

Three hundred grams of a hydroxyl-endblocked linear polydimethylsiloxane with an average molecular weight of 2,200 and a viscosity of approximately 60 cp was heated to 110° C. and catalyzed with 1.0 ml. of a catalyst prepared as in Example 3. This gave a moles of polyorganosiloxane/equivalents of catalyst ratio of 25,000. The resulting mixture was stirred at 110° C. for 36 minutes while volatile material, including water, was removed with the aid of the full water-aspirator vacuum. At the end of the 36 minute polymerization, the vacuum was released and the mixture was heated at 170° C. for 5 minutes to destroy the catalyst. The cooled polymer had a viscosity of 5,800 cp. at 25° C. A weight loss of 2.2%, after heating to 150° C. at aspirator vacuum was measured.

EXAMPLE 12

Dimethylsiloxane cyclics, 1813.3 g., having a viscosity of about 3.0 centistokes, and sym. diphenyldimethyldivinyldisiloxane, 7.4 g., were mixed and heated at 110° C. under a nitrogen sweep overnight to remove water. The catalyst prepared in Example 6, 7.5 ml., was added to the warm mixture using a syringe. A viscosity increase was noted within 12 minutes. After a reaction time of 2 hours at 110° C., during which time anhydrous conditions were maintained with the nitrogen sweep, the mixture was heated to 150° C. for 1 hour to destroy the catalyst. The polydiorganosiloxane of increased molecular weight was devolatilized at 170° C. at 0.1 mm. of mercury pressure. A viscosity of 43,500 was measured at 25° C.

Similar experiments, varying only the diphenyldimethyldivinyldisiloxane and using only 2 hours of drying time at 110° C. gave the results listed in Table II.

TABLE II

| Disiloxane grams | Devolatilization Conditions °C/mm. of mercury | Volatiles grams. | Viscosity cp. at 25°C. |
|---|---|---|---|
| 5.9 | 170/1.2 | 272.2 | 74,560 |
| 4.7 | 170/0.5 | 239.7 | 152,450 |
| 5.9 | 170/0.1 | 299.7 | 109,900 |
| 7.8 | 170/0.1 | 273.5 | 47,500 |
| 6.5 | 170/0.1 | 288.0 | 86,000 |
| 7.2 | 175/0.1 | 275.0 | 52,000 |
| 6.9** | 170/0.1 | 443.5 | 47,000 |
| 6.9 | 170/0.05 | 282.7 | 63,000 |

**This sample was dried only 30 minutes at 110°C.; high volatiles indicates incomplete equilibration.

That which is claimed is:
1. A method of preparing a catalyst suitable for polymerizing polyorganosiloxanes which comprises
   a. mixing
      2. a benzene-soluble organosilicon compound of the average unit formula $$R_a SiO_{\frac{4-a-b}{2}}^{(OH)_b}$$

where R is a radical of 1 to 18 carbon atoms selected from the group consisting of monovalent hydrocarbon radicals, monovalent fluorinated aliphatic radicals and monovalent halogenated aryl radicals, $a$ has an average value of from 1 to 3 and $b$ has an average value of from 0 to 1,
      2. a quaternary phosphonium compound of the formula $R_4'PX$ where each R' is a monovalent hydrocarbon radical of 1 to 18 carbon atoms free of aliphatic unsaturation and X is chlorine, bromine, or iodine,
   3. a basic compound of the formula MOH where M is an alkali metal and
   4. water in at least sufficient quantity to dissolve the basic compound (3), wherein the quaternary phosphonium compound is present in an amount equal to from 0.03 moles to 1.5 moles for each 1,000 grams of the organosilicon compound and the basic compound is present in an amount equal to from 90% to 110% by moles, based on the number of moles of the quaternary phosphonium compound,
   b. removing substantially all of the water from the mixture of (a) at a temperature of from at least 30° to about 100° C., and
   c. recovering the remainder of the mixture as an anhydrous phosphorous containing organo-Silicon catalyst, containing an insoluble, non-catalytic, by-produced salt, MX, where M and X are as defined above.

2. The method of claim 1 wherein the by-produced salt, MX, is removed from said anhydrous phosphorous containing organo-Silicon catalyst and the remainder is recovered as a homogeneous anhydrous catalyst.

3. The method of claim 2 wherein $a$ has an average value of from 1.98 to 2.02 and $b$ has an average value of from zero to 0.7.

4. The method of claim 2 wherein the quaternary phosphonium compound (2) and the basic compound (3) are dissolved in said water prior to being mixed with the organosilicon compound.

5. The method of claim 4 wherein the organosilicon compound is a mixture of a major amount of dimethylcyclopolysiloxanes and a minor amount of a low viscosity triorganosilyl-endblocked polydimethylsiloxane, where the organic groups of the triorganosilyl endgroups are as defined for R.

6. The method of claim 5 wherein the quaternary phosphonium compound (2) is tetra-n-butyl phosphonium chloride and the basic compound (3) is sodium hydroxide.

7. The method of claim 2 wherein the basic compound is sodium hydroxide.

8. A catalyst produced by the method of claim 1.

9. A catalyst produced by the method of claim 2.

10. A method of increasing the molecular weight of a polyorganosiloxane which comprises
    A. mixing,
       i. a benzene-soluble polyorganosiloxane of the average unit formula

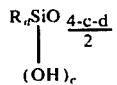

wherein R is a radical of 1 to 18 carbon atoms selected from the group consisting of monovalent hydrocarbon radicals, monovalent fluorinated aliphatic radicals and monovalent halogenated aryl radicals, $c$ has an average value of from zero to 1.0 and $d$ has an average value of from 1.0 to less than 3.0. with
       ii. a catalytic amount of the catalyst produced by the method of claim 2, and
    B. heating the mixture from (A) at a temperature in the range from at least 30° C. to less than 130° C. and removing substantially all of any water from said mixture until an increase in molecular weight of said polyorganosiloxane is effected.

11. The method of claim 10 wherein the polyorganosiloxane of increased molecular weight is heated at a temperature of at least 130° C. until the catalyst is deactivated.

12. The method of claim 10 wherein $c$ has an average value of from zero to 0.7 and $d$ has an average value of from 1.98 to 2.02.

13. The method of claim 10 wherein the catalyst is present in an amount sufficient to produce a ratio of moles of polyorganosiloxane to equivalents of catalyst that is equal to a value from 100 to 1,000,000.

14. The method of claim 13 wherein the product of increased molecular weight is heated to at least 130° C. until the catalyst is deactivated.

15. The method of claim 14 wherein the polyorganosiloxane is

where $x$ has a value of at least 3, and R is as previously defined.

16. The method of claim 15 wherein R is methyl.

* * * * *

UNITED STATES PATENT AND TRADEMARK OFFICE
CERTIFICATE OF CORRECTION

PATENT NO. : 4,008,261
DATED : February 15, 1977
INVENTOR(S) : ERIC D. BROWN, ET AL.

It is certified that error appears in the above-identified patent and that said Letters Patent are hereby corrected as shown below:

Column 12, line 44, "if" should read --is--.

Column 12, line 55, "increase" should read --*increase*--.

Column 14, Claim 1, line 24, "of" should read --for--.

Column 14, Claim 1, line 27, "2." should read --1.--.

Column 14, Claim 1, line 65, "organo-Silicon" should read --organo-silicon--.

Column 15, Claim 2, line 3, "organo-Silicon" should read --organo-silicon--.

UNITED STATES PATENT AND TRADEMARK OFFICE
CERTIFICATE OF CORRECTION

PATENT NO. : 4,008,261
DATED : February 15, 1977
INVENTOR(S) : ERIC D. BROWN, ET AL.

It is certified that error appears in the above-identified patent and that said Letters Patent are hereby corrected as shown below:

Column 12, line 44, "if" should read --is--.

Column 12, line 55, "increase" should read --increase--.

Column 14, Claim 1, line 24, "of" should read --for--.

Column 14, Claim 1, line 27, "2." should read --1.--.

Column 14, Claim 1, line 65, "organo-Silicon" should read --organo-silicon--.

Column 15, Claim 2, line 3, "organo-Silicon" should read --organo-silicon--.

Signed and Sealed this

Fourteenth Day of November 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,008,261
DATED : February 15, 1977
INVENTOR(S) : ERIC D. BROWN, ET AL.

It is certified that error appears in the above-identified patent and that said Letters Patent are hereby corrected as shown below:

Column 1, line 27, "depolymerization" should read --depolymerizations--.

Column 1, line 67, "of" should read --for--.

Column 2, line 27, "8" should read --18--.

Column 2, line 50, "110°C." should read --100°C.--.

Column 5, line 8, "1-8" should read --1-18--.

Column 5, line 38, "decomposion" should read --decomposition--.

Column 5, line 51, "Once" should read --One--.

Column 7, line 40, "temperature" should read --temperatures--.

Column 8, line 42, "averate" should read --average--.

Column 9, lines 1-5, the formula should read

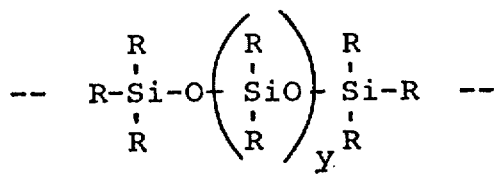

Column 9, line 65, "temperature" should read --temperatures--.

Column 10, line 50, "aded" should read --added--.

Column 12, line 39, "or" should read --of--.

UNITED STATES PATENT AND TRADEMARK OFFICE
CERTIFICATE OF CORRECTION

PATENT NO. : 4,008,261
DATED : February 15, 1977
INVENTOR(S) : ERIC D. BROWN, ET AL.

It is certified that error appears in the above-identified patent and that said Letters Patent are hereby corrected as shown below:

Column 12, line 44, "if" should read --is--.

Column 12, line 55, "increase" should read --increase--.

Column 14, Claim 1, line 24, "of" should read --for--.

Column 14, Claim 1, line 27, "2." should read --1.--.

Column 14, Claim 1, line 65, "organo-Silicon" should read --organo-silicon--.

Column 15, Claim 2, line 3, "organo-Silicon" should read --organo-silicon--.

THIS CERTIFICATE SUPERSEDES CERTIFICATE OF CORRECTION ISSUED November 14, 1978.

Signed and Sealed this

Sixteenth Day of December 1980

[SEAL]

Attest:

SIDNEY A. DIAMOND

Attesting Officer

Commissioner of Patents and Trademark